United States Patent [19]

Mosier

[11] Patent Number: 5,739,802
[45] Date of Patent: Apr. 14, 1998

[54] STAGED ACTIVE MATRIX LIQUID CRYSTAL DISPLAY WITH SEPARATED BACKPLANE CONDUCTORS AND METHOD OF USING THE SAME

[75] Inventor: Donald E. Mosier, Cedar Rapids, Iowa

[73] Assignee: Rockwell International, Costa Mesa, Calif.

[21] Appl. No.: 449,601

[22] Filed: May 24, 1995

[51] Int. Cl.$^6$ .................................................. G02F 1/1343
[52] U.S. Cl. ............................................. 345/89; 345/92
[58] Field of Search ................................. 345/55, 34, 92, 345/80, 93; 359/55, 58–59

[56] References Cited

U.S. PATENT DOCUMENTS

| | | | |
|---|---|---|---|
| 4,781,438 | 11/1988 | Noguchi | 359/59 |
| 4,820,222 | 4/1989 | Holmberg et al. | 345/93 |
| 4,834,505 | 5/1989 | Migliora et al. | 359/59 |
| 4,840,460 | 6/1989 | Bernot et al. | 359/59 |
| 4,965,565 | 10/1990 | Noguchi | 359/59 |
| 4,969,718 | 11/1990 | Noguchi et al. | 359/54 |
| 5,126,865 | 6/1992 | Sarma | 359/59 |
| 5,132,820 | 7/1992 | Someya et al. | 359/59 |
| 5,142,392 | 8/1992 | Ueki et al. | 359/67 |
| 5,144,288 | 9/1992 | Hamada et al. | 345/152 |
| 5,150,240 | 9/1992 | Kim | 359/87 |
| 5,191,452 | 3/1993 | Sarma | 359/59 |
| 5,193,018 | 3/1993 | Wu | 359/59 |
| 5,319,480 | 6/1994 | McCartney | 359/59 |
| 5,349,366 | 9/1994 | Yamazaki et al. | 345/92 |
| 5,448,258 | 9/1995 | Edwards | 345/92 |
| 5,535,027 | 7/1996 | Kimura et al. | 359/58 |

*Primary Examiner*—Mark R. Powell
*Attorney, Agent, or Firm*—John Veldhuis-Kroeze; Kyle Eppele

[57] ABSTRACT

A method of and apparatus for charging select pixel elements of an active matrix liquid crystal display to gray scale voltage levels is disclosed. Which of the pixel elements of the display are to be charged to a first gray scale voltage level is determined. During a scan of the row conductors for the first gray scale voltage level, pixel elements in each enabled row which are to be charged to the first gray scale voltage level are selected. After completion of the scan for the first gray scale voltage level, all of the selected pixel elements in the display are simultaneously charged to the first gray scale voltage level.

14 Claims, 5 Drawing Sheets

STAGED ACTIVE MATRIX LIQUID CRYSTAL DISPLAY WITH SEPARATED BACKPLANE CONDUCTORS AND METHOD OF USING THE SAME

BACKGROUND OF THE INVENTION

The present invention relates generally to liquid crystal displays (LCDs), and more particularly to an improved active matrix liquid crystal display (AM-LCD) panel and method of using the same.

Despite offering advantageous performance characteristics as compared to passive displays, AM-LCDs have several significant problems. Due to the row sequential nature of their drive, larger or higher density panels (with a large number of rows) are severely restricted in the time available for charging any particular pixel element. To facilitate this problem, the thin film transistors (TFTs) coupling the pixel elements to the row and column conductors must be made very large to facilitate rapid charge-up. The large size of the TFTs severely limits aperture ratio.

Alternatively, the time available for charging particular rows of pixel elements may be extended by reducing the refresh rate. This in turn allows smaller TFTs to be used and the aperture ratio to be improved. However, reducing the refresh rate leads to excessive flicker. It is also possible to restrict the voltage operating range to reduce the total charge requirement. However, this limits total display optical response.

In prior art display panel designs, TFT leakage contributes to a phenomenon known as cross-talk. As the display is operated, voltages corresponding to the desired gray scale drive levels are applied to the pixel elements via column conductors. Since TFTs connect the column conductors to the pixel elements, TFT leakage is dependent on the column voltages (and thus the display content) associated with other pixel elements. This dependence results in cross-talk.

Another problem in prior art LCD panel designs and attributed to TFTs is a result of parasitic capacitance. In prior art panels, when each TFT is turned off, a certain charge is coupled from the gate of the TFT to the pixel element. The amount of coupling is directly related to the pixel element voltage. Thus, differing amounts of coupled charge will be induced on pixel elements with different operating voltages, making elimination of the resulting DC bias by compensation nearly impossible.

Yet another problem in the prior art is that current AM-LCD column and/or row conductor drivers are very complicated and expensive. They typically are required to output as many as 192 precisely controlled analog voltage levels simultaneously. The invention offers relief in each of these problem areas which have severely limited the application of large size, high density AM-LCDs.

SUMMARY OF THE INVENTION

It is an object of the present invention to provide a new LCD panel configuration and method of operating the same which allows the use of smaller TFTs to improve aperture ratio of the display. It is a second object of the present invention to provide a LCD panel configuration and method of operating the same which increases the pixel charge time without having to decrease the refresh rate. It is a third object of the present invention to provide a new LCD panel configuration which has reduced cross-talk. It is a fourth object of the present invention to provide a new LCD panel configuration and method of operating the same which has reduced flicker effects. It is a fifth object of the present invention to provide an LCD having simplified column and row driver requirements.

The present invention is an active matrix liquid crystal display structure and a method of driving the display structure to provide an increase in charge time available for each pixel element. In accordance with the display structure and method of the present invention, all pixel drive voltages are applied directly to two backplane conductors instead of to the column and/or row conductors. The staged active matrix array is used to control the application of the drive voltages to the pixel elements. Since the pixel elements of the display are not charged through the column or row conductors as is the case in conventional panel designs, the charge time available per pixel element is not limited to the row scan time.

According to the preferred method of the present invention, which of the pixel elements of the display are to be charged to a first gray scale voltage level is determined. During a first scan of the row conductors for the first gray scale voltage level, pixel elements in each enabled row which are to be charged to the first gray scale voltage level are selected. After completion of the first scan of all of the rows for the first gray scale voltage level, all of the selected pixel elements in the display are simultaneously charged to the first gray scale voltage level. The process is repeated for each desired gray scale voltage level.

BRIEF DESCRIPTION OF THE DRAWINGS

The invention may be more fully understood by reading the following description of preferred embodiments of the invention in conjunction with the appended drawings wherein.

DETAILED DESCRIPTION OF THE PREFERRED EMBODIMENTS

Figure 1:
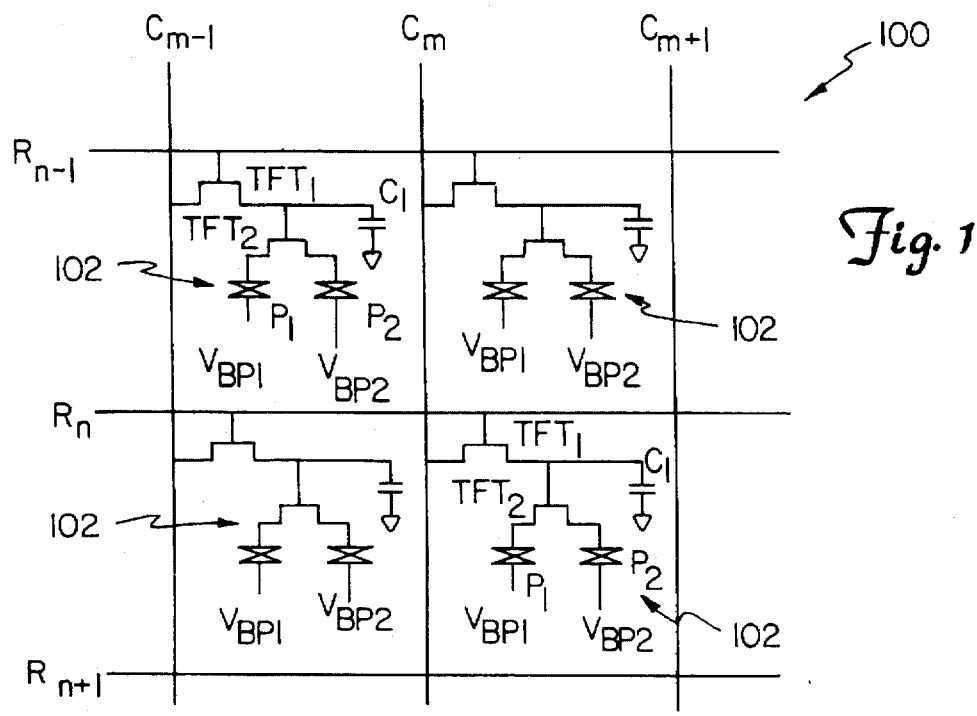
FIG. 1 is a schematic diagram of an LCD panel in accordance with preferred embodiments of the present invention.
Figure 2:
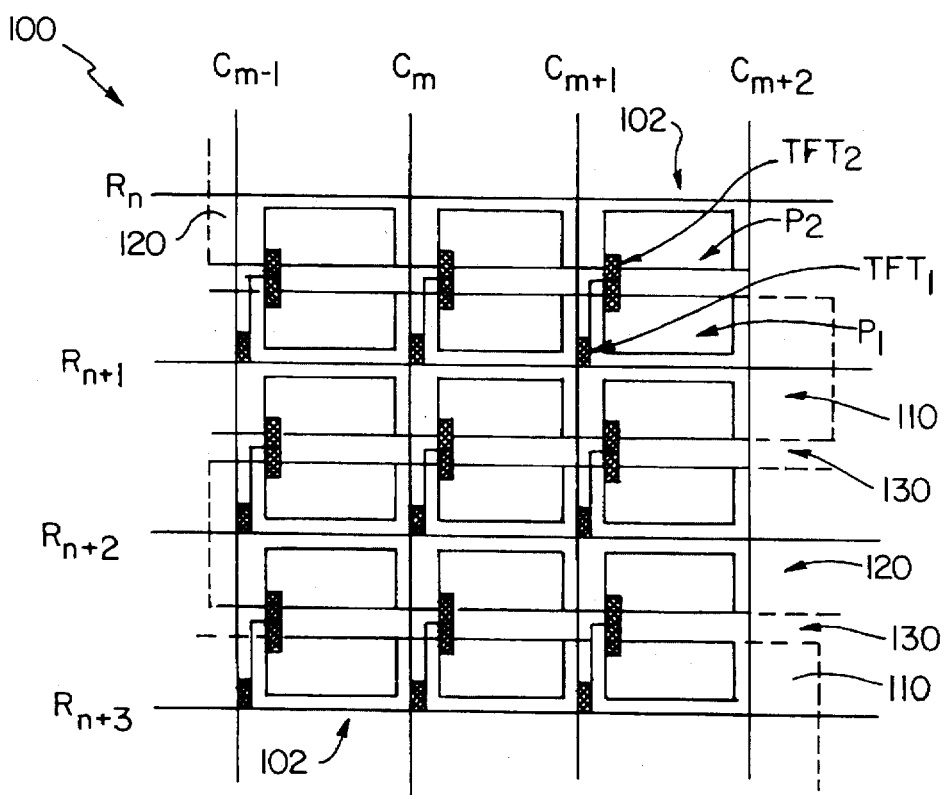
FIG. 2 is diagrammatic illustration of the LCD panel of FIG. 1.

FIGS. 1 and 2 are a schematic diagram and a diagrammatic illustration, respectively, of an LCD panel in accordance with preferred embodiments of the present invention. LCD panel 100 includes a plurality of individual pixel elements 102 arranged in a matrix (only four pixel elements are shown), a plurality of column conductors C (only column conductors $C_{m-1}$ though $C_{m+1}$ are shown), a plurality of row conductors R (only row conductors $R_{n-1}$ through $R_{n+1}$ are shown), and first and second backplane conductors 110 and 120 (shown in FIG. 2 only, but represented as $V_{BP1}$ and $V_{BP2}$ in FIG. 1 ). Also included in panel 100 and associated with each pixel element 102 are a pair of thin film transistors $TFT_1$ and $TFT_2$ and a capacitor $C_1$ (shown in FIG. 1 only). As is discussed below in greater detail, inclusion of capacitor $C_1$ with each pixel element 102 is optional in some preferred embodiments.

In the preferred embodiment illustrated in FIGS. 1 and 2, backplane conductors 110 and 120 extend in a direction parallel to that of row conductors R. Backplane conductors 110 and 120 alternate such that substantially every section of backplane conductor 120 is positioned between two electrically connected sections of backplane conductor 110 and vice versa. Backplane conductors 110 and 120 are electrically separated by gaps 130.

Column conductors C and row conductors R are oriented orthogonal to one another with, in preferred embodiments, one pixel element positioned between every two consecutive column conductors and between every two consecutive row conductors. Each pixel element 102 is separated into two halves or pixel sub-elements $P_1$ and $P_2$. Description of the physical arrangement and electrical connections of the pixel elements and their associated components is frequently limited to one pixel element 102.

However, it is intended that all pixel elements and associated components can be configured identically.

A first or electrode of each of pixel sub-elements $P_1$ and $P_2$ is coupled to a different one of the source and drain electrodes of associated transistor $TFT_2$ so that, when transistor $TFT_2$ is "on" or in a conducting state, a current path is formed between the two pixel sub-elements. The two pixel sub-elements are also situated relative to sections of backplane conductors 110 and 120 such that each is adjacent a different backplane conductor. The second electrodes of pixel sub-elements $P_1$ and $P_2$ consist of the portions of backplane conductors 110 and 120 which are situated adjacent to the first sides.

The control electrode of transistor $TFT_2$ is coupled to the source or drain electrode of transistor $TFT_1$. The other of the source or drain electrodes of transistor $TFT_1$ is coupled to the corresponding column conductor associated with the particular pixel element, while the control electrode of $TFT_1$ is coupled to the corresponding row conductor. Capacitor $C_1$ can optionally be coupled between the gate electrode of transistor $TFT_2$ and ground.

Generally, each pixel element 102 is charged to a specific gray scale voltage as follows. If a sufficiently large voltage is applied to a row conductor during a scan, transistors $TFT_1$ of the corresponding pixel elements in the row will turn on. If the voltage of a pixel element's associated column conductor is also high, the voltage will be transferred from the column conductor, through transistor $TFT_1$, to the gate of transistor $TFT_2$. This causes transistor $TFT_2$ to turn on as well. As the voltage differential between the drain and source of transistor $TFT_2$ approaches zero volts, the voltage differential between $V_{BP1}$ (backplane 110) and $V_{BP2}$ (backplane 120) is divided across pixel sub-elements $P_1$ and $P_2$. If the characteristics of pixel sub-elements $P_1$ and $P_2$ are the same, the voltage differential between $V_{BP1}$ and $V_{BP2}$ will be divided evenly across $P_1$ and $P_2$. Since only enough charge to cause transistor $TFT_2$ to conduct must be transferred through the row and/or column conductors, the scan time per row can be greatly reduced. If necessary to keep $TFT_2$ conducting for a sufficient period of time after the row scan is complete, capacitor $C_1$ can be included and can be charged through $TFT_1$ during the row scan to keep $TFT_2$ conducting after the row scan is completed.

Figure 3:
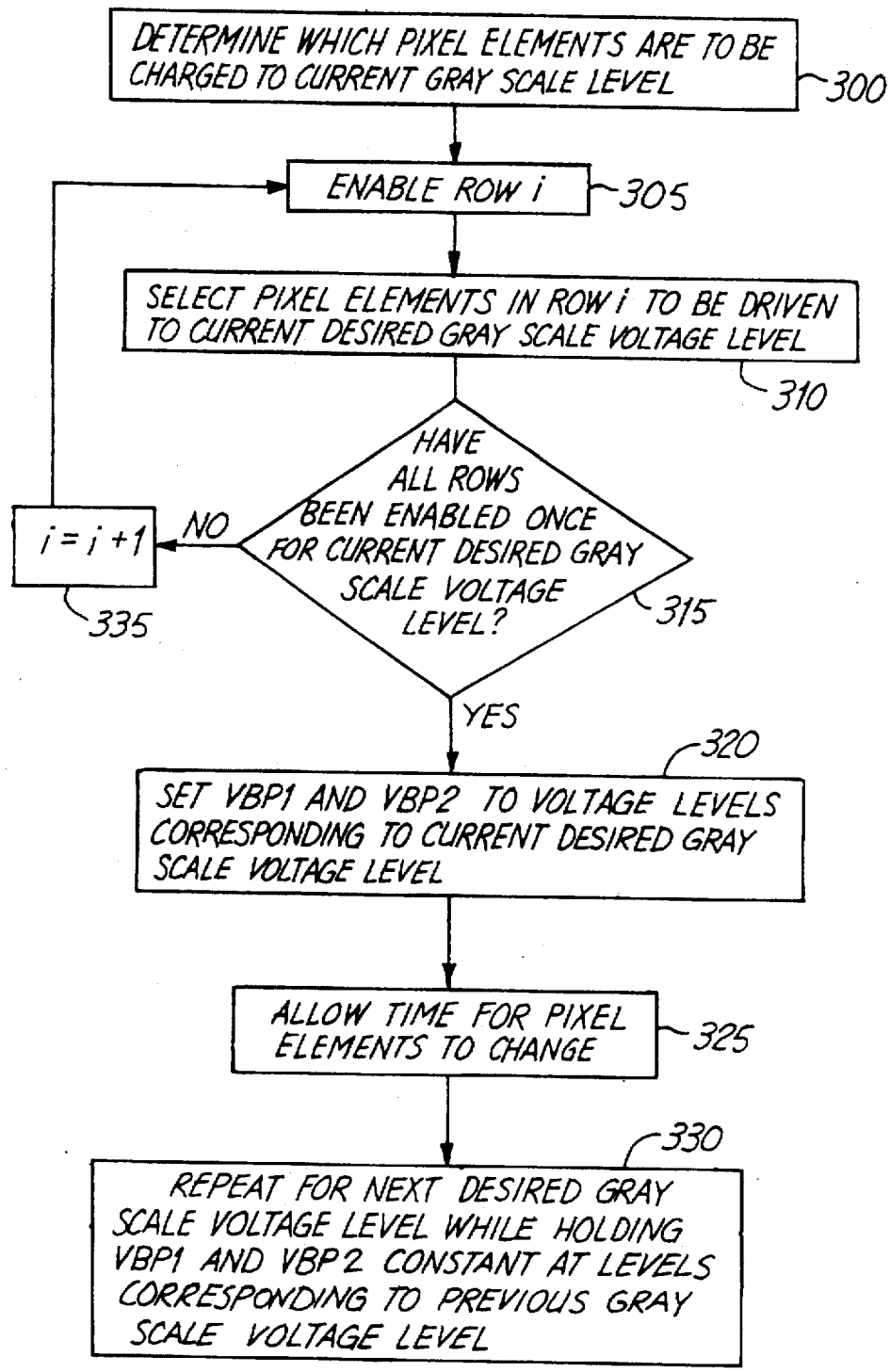
FIG. 3 is a flow diagram illustrating a method of using the LCD panel and drive system of the present invention.
Figure 4:
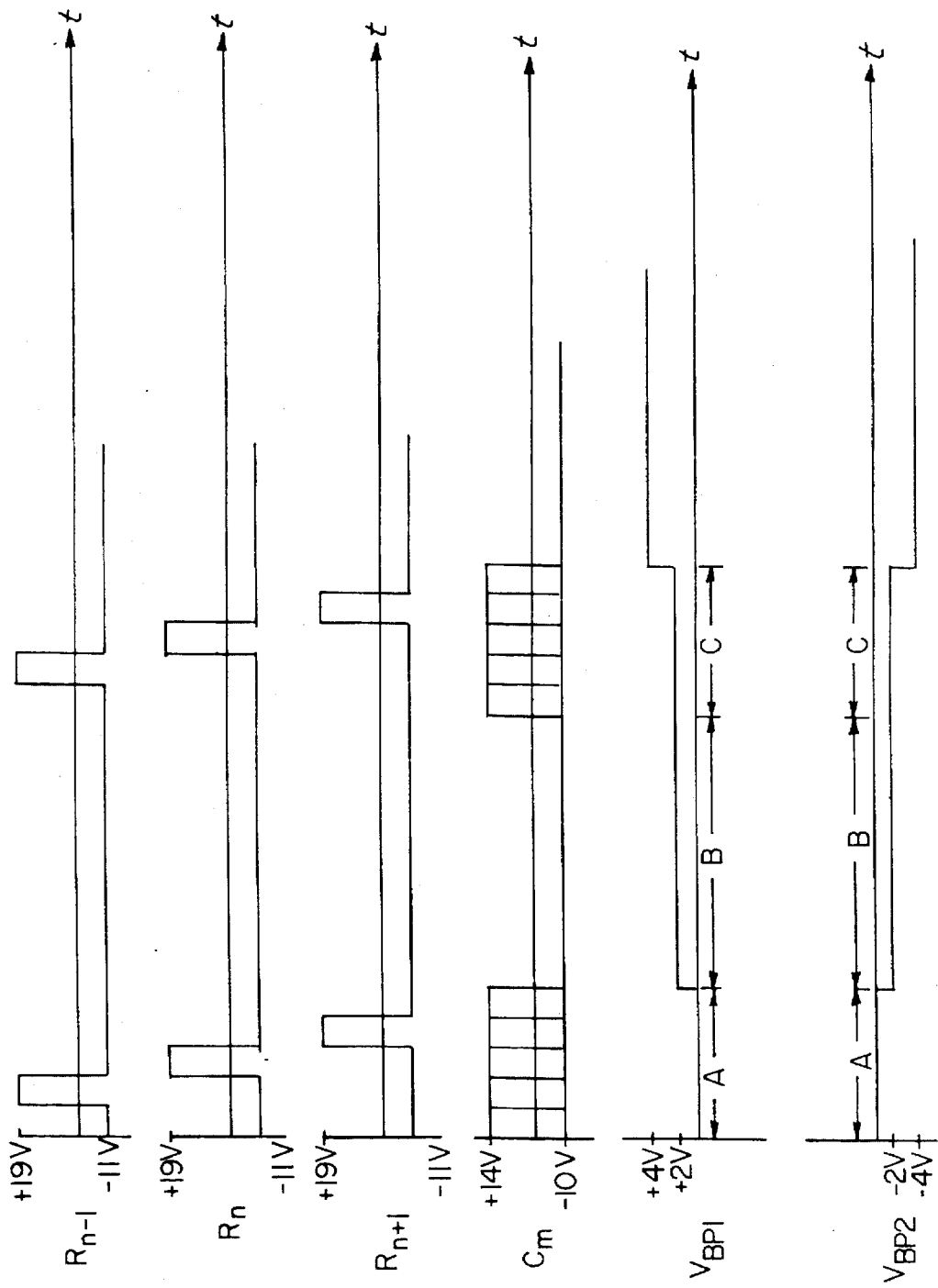
FIG. 4 is a timing diagram illustrating a method of driving the LCD panel of the present invention.

The flow diagram of FIG. 3 and the timing diagram of FIG. 4 provide more specific examples of a preferred method of operating panel 100 to achieve the benefits of the present invention. As shown in FIG. 3, it is first determined (300) which pixel elements are to be charged to a first gray scale voltage level. Then, as each successive row is enabled (320,315,335) during a scan or scan cycle for the first gray scale voltage level, the appropriate pixel elements in the enabled row are selected (310). Once all of the rows have been enabled once so that the intended pixel elements have all been selected, backplanes 110 and 120 are driven with voltages corresponding to the first desired gray scale voltage level in order to charge the selected pixel elements (320, 325). The process is repeated for each desired gray scale voltage level (330).

The method shown in FIG. 3 is also detailed in the timing diagram of FIG. 4. FIG. 4 illustrates plots of voltage versus time for three row conductors $R_{n-1}$ through $R_{n+1}$, one column conductor $C_m$, and backplanes 110 ($V_{BP1}$) and 120 ($V_{BP2}$). Obviously, panel 100 of the present invention includes more row and column conductors than are included in the timing diagram of FIG. 4. However, the representative sample provided in FIG. 4 adequately illustrates the method of the present invention.

According to the preferred method of the present invention, panel 10 is controlled to operate as follows. All of the rows are scanned once for each gray scale voltage level. During a scan cycle for a particular gray scale level, each row is sequentially enabled by driving it with a first logic level voltage. While a particular row is enabled, all of the remaining (non-enabled) rows are driven with a second logic level voltage. Typical values for the first and second logic level voltages are +19V (enabled) and −11V (non-enabled). The sequential enablement of rows is illustrated in FIG. 4 by the first voltage pulses on each of row conductors $R_{n-1}$ through $R_{n+1}$.

During a scan cycle for a particular gray scale voltage level, as each successive row is enabled, the column conductors are driven to logic levels indicative of whether or not the particular pixel elements in the enabled row should be "selected" or "enabled" for subsequent charging to the gray scale level in question. Typical column drive voltages are +14V (for selection) and −10V (for non-selection). The selection or non-selection of pixel elements in a particular column is represented in FIG. 4 by the waveform of column conductor $C_m$. This waveform represents the fact that, during the time that each individual row is enabled, column conductor $C_m$ is driven with either the select voltage or the non-select voltage.

When a particular row conductor is enabled (row $R_{n-1}$ for example), the gate electrodes of transistors $TFT_1$ associated with each pixel element in that row are driven with the enabling logic level voltage pulse. Transistors $TFT_1$ associated with selected pixel elements turn "on" or begin to conduct. Capacitors $C_1$ associated with selected pixel elements are charged, through conducting transistors $TFT_1$, to voltage levels approaching the enabling voltage carried by the particular column conductors. When a particular row is disabled as the scan continues, transistors $TFT_1$ turn off, but capacitors $C_1$ provide drive voltages to the gates of transistors $TFT_2$ while other rows are being enabled and even after the scan of all rows is completed.

During the scan for any particular gray scale level, backplanes 110 and 120 are still being driven with voltages equal to plus and minus the previous gray scale voltage level (for example, 0 volts in period A of FIG. 4). After completion of the scan for the next desired gray scale level so that all appropriate pixel elements have been enabled or selected, backplanes 110 and 120 are driven to new voltages equal to plus and minus the desired gray scale voltage (for example, first and second backplane voltages +2V and −2V). Pixel elements that were not selected simply follow the backplane voltages, with no change in the impressed voltages across their pixel sub-elements $P_1$ and $P_2$, since their associated $TFT_2$'s are not conducting current. Selected pixel elements are shorted together across their associated conducting transistors $TFT_2$, forcing a capacitive voltage division between $V_{BP1}$ of backplane 110 and $V_{BP2}$ of backplane 120. Thus, in selected pixel elements, pixel sub-elements $P_1$ and $P_2$ are charged to plus and minus the desired gray scale voltage. In order to facilitate full charging of the pixel elements, gray scale voltages $V_{BP1}$ and $V_{BP2}$ are applied to backplane conductors 110 and 120 during a period (for example, period B shown in FIG. 4) in which no rows are enabled and which is considerably longer than the charge time per row of conventional panels.

Next, the rows are scanned again, with appropriate pixel elements 102 being selected or enabled for the next gray level. This is represented in FIG. 4 by the second pulse on each of row conductors $R_{n-1}$ through $R_{n+1}$ and by the second pulse train on column conductor $C_m$. During this second scanning period, the backplane voltages remain at the previous voltage levels (i.e., at +2V and −2V in period C). When the scan is completed, the backplane voltages are again adjusted to the next voltage levels (i.e., to third and fourth backplane voltages +4V and to −4V in FIG. 3). This process of selecting or enabling pixel elements during a scan for subsequent charging is repeated for each gray scale level desired. After all gray scale level voltages have been applied, the sequence repeats with the backplane polarity reversed to ensure zero DC bias on every pixel element.

To maintain a constant refresh rate in panel 100 as compared to conventional drive panels, the actual row scan rate must be multiplied by the number of gray scale voltage levels applied. In other words, in the time required to perform one scan in a conventional panel, panel 100 must perform a separate scan for each gray scale level. However, unlike the situation in conventional panel designs, during the reduced row scan time available with panel 100, no actual pixel charging is required.

By contrast, conventional panels use the time that a particular row is enabled to charge the row's pixel elements to their desired gray scale levels. All that is transferred from the enabled row conductor in the present invention is the controlling voltage for the sub-pixel connecting transistor $TFT_2$. The actual voltage for this is not critical, as long as it is either several volts higher than the largest voltage present on either backplane conductor or about one volt lower than the lowest voltage present. The more critical of these two values is the positive voltage, since it partially determines the current capability of $TFT_2$. However, as soon as $TFT_2$ begins to conduct, the actual voltage present at both the drain and source begin to converge on zero, the midpoint between $V_{BP1}$ and $V_{BP2}$. Thus, the actual gate signal is rapidly made very large, promoting current flow.

The positive gating voltage may be further reduced if backplane voltages $V_{BP1}$ and $V_{BP2}$ are momentarily returned to zero immediately after all pixel selection is complete. If that is done, the voltage present at the source and drain terminals of $TFT_2$ is zero. A small gate voltage, on the order of five volts, will then be sufficient to turn on $TFT_2$. Then, if the backplane signals are applied slowly enough so that no large potential builds across $TFT_2$, conduction will continue. However, to eliminate any uncertainty, a larger voltage can be applied to the gate of $TFT_2$ to ensure good conduction characteristics.

The benefits of this approach can be seen in terms of timing requirements for a typical panel. A conventional panel with 512 rows, refreshed at 80 Hz, performs row scans at approximately 41 KHz, thus allowing slightly more than 24 µS for each pixel to completely charge, which requires very large $TFT_s$. This value is independent of the number of gray scale levels used on the panel since the column drivers associated with these conventional panels must be capable of charging each pixel element in a given row to any one of a large number of gray scale voltages simultaneously.

In contrast, a panel manufactured in accordance with the present invention, also with 512 rows and an 80 Hz refresh rate, and with eight gray scale levels, must scan the rows at nearly 328 KHz. The corresponding time that each row can be enabled per scan is only slightly more than 3 µS, far less than the 24 µS available in the conventional panel. However, since no pixel element charging is required during this reduced interval, the available time is more than adequate to charge capacitors $C_1$ for driving transistors $TFT_2$. This is especially true in light of the fact that it is a simple logic level being transferred, not a precision analog voltage level as is the case in conventional panels. The actual time available for pixel charging may approach 1.56 mS, 64 times as long as in the conventional panel. The theoretical limit of charge time is determined by dividing the duration of the total refresh interval (1/80=12.5 mS for this example) by the total number of gray scales (GS) to be driven (12.5 mS /8 GS=1.56 mS/GS).

The present invention provides numerous advantages over conventional panel designs. Since the pixel element charge time is enlarged by nearly two orders of magnitude, the conducting capacity and size of the TFTs may be correspondingly reduced. Reduction in TFT size dramatically increases aperture ratio, since a substantial percentage of the total screen area is occupied by the $TFT_s$. TFTs with reduced size will also have a correspondingly smaller parasitic capacitance. Current panels include large storage capacitors to cancel out the effects of parasitic capacitance induced voltage push-down. This requirement is nearly eliminated with the panel of the present invention. The fact that the current capacity of the TFT is reduced also minimizes leakage, another reason for including large storage capacitors in conventional panels. The combined reduction of TFT and storage capacitor sizes substantially improves aperture ratio.

The present invention also minimizes push-down effect in a second way. Voltage push-down is dependent upon the voltage present at the pixel element electrode at the instant the TFT is turned off. In a conventional panel, the value of the pixel voltage can vary by as much as 18 volts, leading to widely varying push-down values which cannot be easily compensated for. In the disclosed invention, the voltages present at the pixel connected electrodes (drain and source) of $TFT_2$ are always zero at the instant of turn-off. Thus, the push-down voltage, which has already been minimized in value, is made essentially constant and can be compensated for.

The disclosed invention also eliminates cross-talk between pixel elements. In a conventional panel, each pixel element is connected to a column conductor through a relatively leaky TFT. Since the voltage on the column conductor is dependent upon the display content, the pixel element leakage is likewise dependent upon the content of other pixel elements in the same column. Leakage in the panel of the present invention, which is already minimized due to improved TFT geometry, is strictly between two halves or pixel sub-elements of the same pixel. Data content elsewhere on the panel is inconsequential.

The reduced leakage, in combination with the split polarity nature of each pixel element allows the overall refresh rate to be reduced with panel 100 of the present invention. Currently, many CRT systems are refreshed at 60 Hz, which creates a generally acceptable display output. The voltage reversal requirements of LCDs induce a luminance flicker component which occurs at one half the refresh rate. If LCDs are refreshed at 60 Hz, this component will occur at 30 Hz, which is highly visible, even for the small levels of flicker typically present. For this reason, many conventional LCDs are refreshed at 80 Hz, thus increasing the half frequency component to 40 Hz. The 40 Hz half frequency component is less visible, and thus more acceptable, to viewers. In the present invention, pixel sub-elements $P_1$ and $P_2$ are driven with opposite polarity, providing a cancellation effect on the half frequency flicker. Thus, the half frequency flicker can be eliminated or greatly reduced as a driving force in determining the refresh rate.

Another contributor to flicker is TFT leakage. Reduced leakage, such as is obtained with the smaller TFTs used with the present invention, vastly reduces the magnitude of the luminance variations. Because of the above described advantages, it is believed to be possible to reduce the refresh rate of panel 100 to as low as 20 Hz without producing visible flicker. The lower refresh rates possible with the present invention simplify the drive interface and maximize the time available for enabling and/or charging rows of pixel elements.

Figure 5:
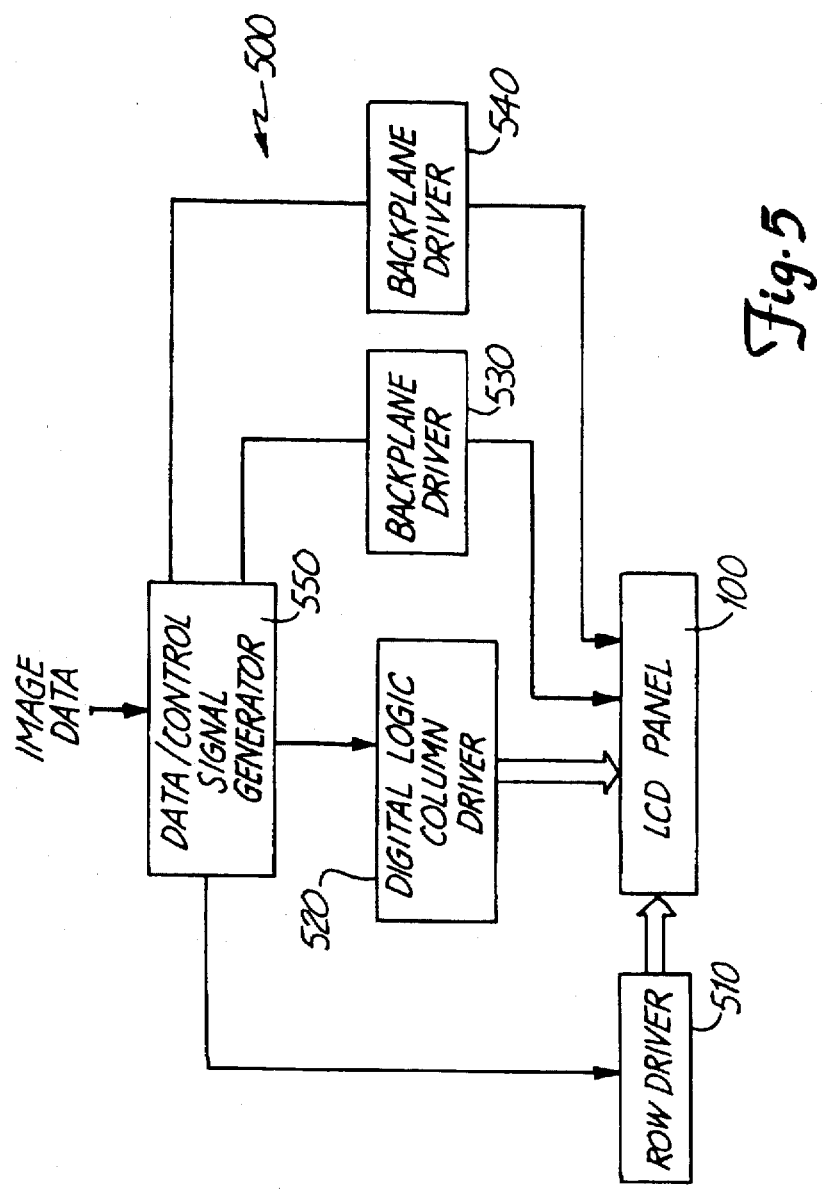
FIG. 5 is a block diagram illustrating a preferred system for driving the LCD panel of the present invention.

FIG. 5 is a block diagram illustrating a preferred system for driving LCD panel 100 of the present invention. System 500 includes row driver 510, column driver 520, backplane driver 530, backplane driver 540, and data/control signal generator 550. Row driver 510 is coupled to row conductors R and can be any driver capable of sequentially enabling one conductor at a time. As such, row driver 510 needs only to produce logic level voltages for the "enabled" and "non-enabled" states of the row conductors.

Column driver 520 is coupled to each of column conductors C, and must be capable of simultaneously driving all of the individual column conductors with one of two logic level voltages for the "selected" and the "non-selected" states. As such, digital logic column driver 520 can be greatly simplified as compared to column drivers for conventional panels which must be capable of simultaneously driving each of the column conductors to any one of a large number of very precisely controlled gray scale voltages.

Backplane drivers 530 and 540 are drivers coupled to backplanes 110 and 120, respectively, and are capable of driving the backplanes to voltages corresponding to each of the desired gray scale voltage levels. In preferred embodiments, drivers 530 and 540 will generate drive voltages equal to plus and minus the desired gray scale voltage level, respectively. Thus, the voltage difference between the two, which is twice the desired gray scale voltage level, will be divided between the two pixel sub-elements to charge each to the desired gray scale voltage, but with opposite polarities.

Data/control signal generator 550 generates control signals for controlling the operation of drivers 510, 520, 530 and 540. The control signals generated by generator 550 control column driver 520 so that the desired data is displayed on the LCD.

Figure 6:
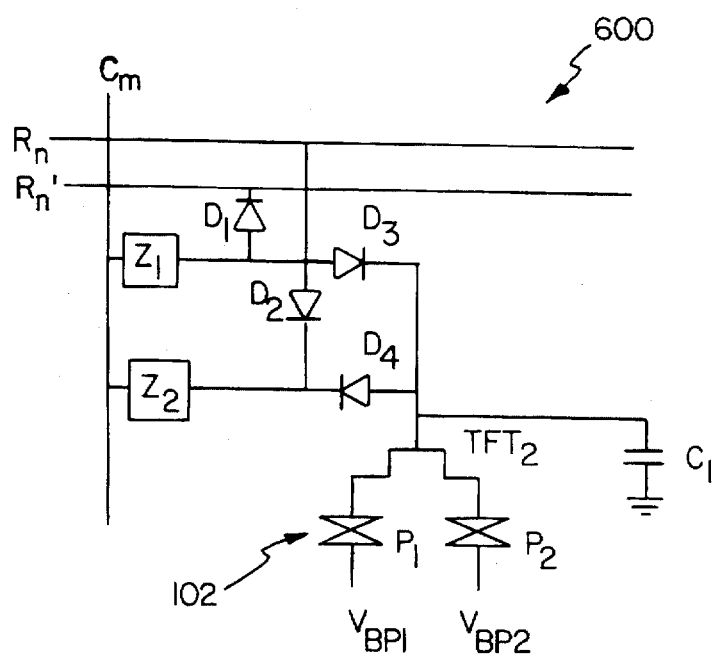
FIG. 6 is a schematic diagram of a second embodiment of an LCD panel in accordance with preferred embodiments of the present invention.

FIG. 6 is a schematic diagram of a single pixel element and associated circuitry which can be used to form a second embodiment of an LCD panel in accordance with the present invention. Circuit 600 has a number of components in common with panel 100 including pixel element 102 having first and second pixel sub-elements $P_1$ and $P_2$, backplanes 110 and 120 (represented in FIG. 6 as backplane voltages $V_{BP1}$ and $V_{BP2}$), transistor $TFT_2$, and optional capacitor $C_1$. Circuit 600 also includes diodes $D_1$ through $D_4$, loads $Z_1$ and $Z_2$, column conductor $C_m$, and row conductors $R_n$ and $R_n'$. Loads $Z_1$ and $Z_2$ can be either a resistor or a small TFT biased to be a resistor.

In the configuration shown in FIG. 6, the gate lines either enable or disable the connection between column conductor $C_m$ and the gate of $TFT_2$. The connection is enabled by driving $R_n$ with a voltage more negative than the most negative voltage to be applied to $C_m$ and driving $R_n'$ with a voltage more positive than the most positive voltage to be applied to $C_m$. Under these conditions, $D_1$ and $D_2$ are reverse-biased, and essentially removed from the circuit. Positive voltages on $C_m$ pass through $D_3$ to charge $C_1$, while negative voltages are passed through $D_4$. The connection is disabled by reversing the voltages on $R_n$ and $R_n'$, thus forward biasing $D_1$ and $D_2$ while reverse biasing $D_3$ and $D_4$. Under this condition, any voltage applied to $C_m$ is dropped across either $Z_1$ or $Z_2$, and prevented from transferring to $C_1$.

The diode configuration of the embodiment shown in FIG. 6 provides certain advantages because the diodes can be made extremely small and redundant to further improve aperture ratio while simultaneously improving yield. The diodes are also inherently faster than TFTs, thus making it possible to address a larger number of rows in the same time interval. However, this embodiment has several disadvantages as compared to the preferred embodiment illustrated in FIGS. 1 and 2 which must be weighed against the advantages of the design.

For example, the embodiment shown in FIG. 6 has two different types of semiconductor devices, diodes and TFTs, fabricated on the same substrate. This can have a negative effect on the manufacturing process. It also has the disadvantage that twice as many row conductors are required, which can have a negative impact on aperture ratio and yield.

Figure 7:
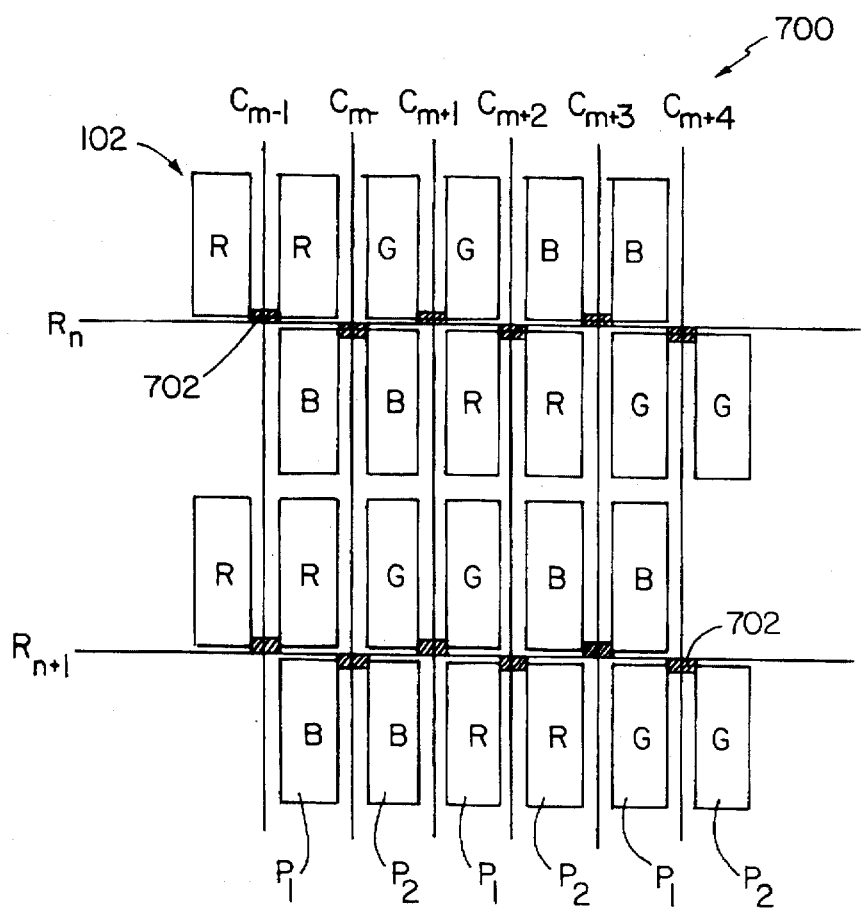
FIG. 7 is a diagrammatic illustration of a third embodiment of an LCD panel in accordance with preferred embodiments of the present invention.

Another alternative embodiment of a display panel offering the advantageous features of the present invention is illustrated diagrammatically in FIG. 7. Panel 700 includes pixel elements 102, column conductors C (only $C_{m-1}$ through $C_{m+4}$ are shown), row conductors R (only $R_n$ and $R_{n+1}$ are shown), and connecting circuits 702. Each pixel element is once again divided into two halves or sub-elements $P_1$ and $P_2$, each having the same color. The pixel elements from one row to the next are offset by one pixel sub-element so that a brickwall pattern can be formed, as can be done with any of the previously described embodiments. Each connecting circuit 702 includes transistors $TFT_1$ and $TFT_2$ and capacitor $C_1$ in a configuration the same as was associated with each pixel element 102 in FIG. 1. However, in the embodiment shown in FIG. 7, the backplane is split vertically into sections. The TFT connecting the two halves of the pixel element crosses the column conductor, and all column lines pass between the pixel element halves. Because two rows of pixel elements are coupled to the same row conductor, this embodiment allows longer row scan times while maintaining all of the benefits of the invention. It also has the potential to further improve aperture ratio due to a reduction in the number of row conductors and the placement of column conductors over the gaps between pixel halves.

While particular embodiments of the present invention have been shown and described, it should be clear that changes and modifications may be made to such embodiments without departing from the true scope and spirit of the invention. It is intended that the appended claims cover all such changes and modifications. For example, the present invention has been described with certain functions being performed with row conductors while other functions are performed with column conductors. It is clear that these functions can be reversed in other embodiments so that functions performed with row conductors are performed with the column conductors instead and vice versa. This application is intended to cover these types of modifications as well.

I claim:

1. A method of charging select pixel elements of an active matrix liquid crystal display to gray scale voltage levels comprising:

determining which pixel elements of the display are to be charged to a first gray scale voltage level;

selecting pixel elements, in each of a plurality of rows, which are to be charged to the first gray scale voltage level; and after all pixel elements of the display which are to be charged to the first gray scale voltage level have been selected, charging all of the selected pixel elements to the first gray scale voltage level.

2. A method of charging select pixel elements of an active matrix liquid crystal display to gray scale voltage levels, pixel elements of the display being arranged on a display panel in rows, the display panel having a plurality of row conductors and a plurality of column conductors arranged such that each pixel element is electrically coupled to at least an associated one of the plurality of column conductors and to at least an associated one of the plurality of row conductors, the method comprising:

determining which of the pixel elements of the display are to be charged to a first gray scale voltage level;

scanning the plurality of row conductors during a first scan cycle for the first gray scale voltage level, wherein scanning the plurality of row conductors during the first scan cycle includes sequentially enabling the plurality of row conductors such that each of the plurality of row conductors has an enabling voltage applied thereto at least once during the first scan cycle and such that essentially only one of the plurality of row conductors has the enabling voltage applied thereto at any one time during the first scan cycle;

while each of the plurality of row conductors has the enabling voltage applied thereto, selecting pixel elements which are coupled to the enabled row conductor and which are to be charged to the first gray scale voltage level, wherein pixel elements are selected by driving, with a first selecting voltage, the associated ones of the plurality of column conductors coupled to the pixel elements which are to be charged to the first gray scale voltage level; and charging the selected pixel elements in each row to the first gray scale voltage level during a first time period, at least a portion of the first time period occurring while particular rows do not have the enabling voltage applied thereto.

3. The method of claim 2 wherein charging the selected pixel elements during the first time period includes charging the selected pixel elements during a time period occurring essentially entirely after the first scan cycle has been completed.

4. The method of claim 2 wherein selecting pixel elements which are coupled to the enabled row conductors and which are to be charged to the first gray scale voltage level includes driving the associated ones of the plurality of column conductors with a digital logic column driver capable of simultaneously driving each of the plurality of column conductors with either of two digital logic level voltages.

5. The method of claim 2 wherein the panel further includes a first backplane conductor and a second backplane conductor, and wherein each pixel element of the display is coupled to the first backplane conductor and to the second backplane conductor so that a current path is established through each of the selected pixel elements between the first and second backplane conductors, charging the selected pixel elements during the first time period comprising:

applying a first backplane voltage to the first backplane conductor; and applying a second backplane voltage to the second backplane conductor so that a charging current is induced through each of the selected pixel elements, the first and second backplane voltages having voltage values chosen so that the selected pixel elements are charged to the first gray scale voltage level.

6. The method of claim 5 wherein the first and second backplane voltage values have essentially equal magnitudes and have opposite polarities from one another.

7. The method of claim 5 and further comprising:

determining which of the pixel elements of the display are to be charged to a second gray scale voltage level;

scanning the plurality of row conductors during a second scan cycle for the second gray scale voltage level, wherein scanning the plurality of row conductors during the second scan cycle includes sequentially enabling the plurality of row conductors such that each of the plurality of row conductors has an enabling voltage applied thereto at least once during the second scan cycle and such that essentially only one of the plurality of row conductors has the enabling voltage applied thereto at any one time during the second scan cycle;

while each of the plurality of row conductors has the enabling voltage applied thereto, selecting pixel elements which are coupled to the enabled row conductor and which are to be charged to the second gray scale voltage level, wherein pixel elements are selected by driving, with the first selecting voltage, the associated ones of the plurality of column conductors coupled to the pixel elements which are to be charged to the second gray scale level; and charging the selected pixel elements in each row to the second gray scale voltage level during a second time period, at least a portion of the second time period occurring while particular rows do not have the enabling voltage applied thereto, charging the selected pixel elements during the second time period comprising:

applying a third backplane voltage to the first backplane conductor; and applying a fourth backplane voltage to the second backplane conductor so that a charging current is induced through each of the selected pixel elements, the third and fourth backplane voltages having voltage values chosen so that the selected pixel elements are charged to the second gray scale voltage level.

8. A method of driving a liquid crystal display panel, the panel having a first plurality of parallel conductors, a second plurality of parallel conductors oriented perpendicular to the first plurality of parallel conductors, a plurality of selection circuits, a plurality of pixel elements, and first and second backplane conductors, each of the plurality of pixel elements being coupled to an associated one of the first plurality of parallel conductors and to an associated one of the second plurality of parallel conductors through an associated one of the plurality of selection circuits, each of the plurality of pixel elements also being coupled to both of the first and second backplane conductors, the method comprising:

determining which of the plurality of pixel elements are to be driven to a first gray scale voltage level;

performing a first scan of the first plurality of parallel conductors, wherein performing the first scan of the first plurality of parallel conductors includes enabling each of the first plurality of parallel conductors one conductor at a time, a conductor being an enabled conductor when driven with a first drive voltage so that the first drive voltage is applied to the selection circuits of each pixel element coupled to the enabled conductor;

while each of the first plurality of parallel conductors is enabled, selecting pixel elements which are coupled to the enabled conductor and which are to be driven to the first gray scale voltage level, wherein pixel elements are selected by driving, with a second drive voltage, the associated ones of the second plurality of parallel conductors coupled to the pixel elements which are both coupled to the enabled conductor and are to be charged to the first gray scale voltage level, wherein the selection circuit associated with each selected pixel element enables a current path from the first backplane conductor to the second backplane conductor through the selected pixel element; and charging the selected pixel elements of the display panel to the first gray scale voltage level during a first time period at least a portion of which occurs after the first scan cycle is completed, wherein charging the selected pixel elements to the first gray scale voltage level includes driving the first backplane conductor with a first backplane voltage so that a current flows from the first backplane conductor through the selected pixel elements and into the second backplane conductor, the current charging the selected pixel elements to the first gray scale voltage level.

9. A liquid crystal display comprising:

a plurality of column conductors;

a plurality of row conductors;

a plurality of pixel elements, each of the plurality of pixel elements having one of the plurality of column conductors and one of the plurality of row conductors associated therewith;

selection means associated with each of the plurality of pixel elements for enabling select pixel elements for subsequent charging to a first gray scale voltage level, wherein the selection means associated with each pixel element is coupled to the pixel element and to the associated one of the plurality of column conductors and to the associated one of the plurality of row conductors, the selection means associated with each pixel element to be charged to the first gray scale voltage level enabling the pixel element during an enabling time period for the associated one of the plurality of row conductors, the enabling time period for the associated one of the plurality of row conductors occurring during a scan of the plurality of row conductors for the first gray scale voltage level;

means for charging enabled pixel elements to the first gray scale voltage level during a charging time period occurring at least partially after completion of the particular enabling time period.

10. The liquid crystal display of claim 9 wherein the charging time period is longer than the enabling time period for any individual row conductor.

11. The liquid crystal display of claim 9 wherein each of the plurality of pixel elements comprises:

a first pixel sub-element coupled to the selection means associated with the pixel element, the first pixel sub-element having a first color associated therewith; and a second pixel sub-element coupled to the selection means associated with the pixel element, the second pixel sub-element having the first color associated therewith.

12. The liquid crystal display of claim 11 wherein the means for charging enabled pixel elements comprises:

a first backplane conductor coupled to a first side of the first pixel sub-element of each pixel element;

a second backplane conductor coupled to a first side of the second pixel sub-element of each pixel element;

means for driving the first backplane conductor with a first backplane voltage corresponding to the first gray scale voltage level during the charging time period;

means for driving the second backplane conductor with a second backplane voltage corresponding to the first gray scale voltage level during the charging time period, wherein driving the first backplane conductor with the first backplane voltage and driving the second backplane conductor with the second backplane voltage charges each of the first and second pixel sub-elements of enabled pixel elements to the first gray scale voltage level.

13. The liquid crystal display of claim 12 wherein the selection means enables select pixel elements by providing a current path between the second side of the first pixel sub-element and the second side of the second pixel sub-element so that a current path is formed from the first backplane conductor, through the first and second pixel sub-elements, to the second backplane conductor, wherein a voltage differential between the first backplane voltage and the second backplane voltage is divided substantially evenly across the first and second pixel sub-elements.

14. A liquid crystal display comprising:

a plurality of column conductors;

a plurality of row conductors;

a first pixel charging conductor;

a second pixel charging conductor;

a plurality of pixel elements arranged in rows, each pixel element comprising:

a first pixel sub-element having a first color associated therewith and coupled to the first pixel charging conductor; and a second pixel sub-element having the first color associated therewith and coupled to the second pixel charging conductor; and a plurality of pixel element selection circuits, each of the plurality of pixel element selection circuits coupling one of the plurality of pixel elements to an associated one of the plurality of row conductors and to an associated one of the plurality of column conductors, each pixel element selection circuit corresponding to a pixel element to be charged to a first gray scale voltage level enabling its associated pixel element for subsequent charging to the first gray scale voltage level upon receipt of voltage signals on its associated one of the plurality of row conductors and its associated one of the plurality of column conductors, wherein enabled pixel elements provide a current path from the first pixel charging conductor, through the first and second pixel sub-elements, to the second pixel charging conductor so that the first and second pixel sub-elements are charged to the first gray scale voltage level.

* * * * *